March 22, 1927.  O. W. MANN  1,621,514

TABLE CASTER

Filed Dec. 23, 1925

INVENTOR
O. W. Mann
BY E. J. Fetherstonhaugh
ATTORNEY

Patented Mar. 22, 1927.

1,621,514

UNITED STATES PATENT OFFICE.

OSWALD WYNDHAM MANN, OF MONTREAL, QUEBEC, CANADA.

TABLE CASTER.

Application filed December 23, 1925. Serial No. 77,248.

The invention relates to a table caster, as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to combine two or more table condiments in one receptacle and thereby enable the diner to prepare the food for consumption without changing around from one table accessory to another; to facilitate the work of maids, waiters or other table attendants in preparing the table or tables for the meals; to reduce the cost of table furnishings in hotels, restaurants and other eating places; to produce this accessory in its most adaptable and finished condition at a modest cost, so far as its constructional features are concerned and yet permit of elaboration for the more expensive tastes; to maintain the condiments completely apart and deliver them separately and in good condition; and generally to provide a neat, durable and serviceable table caster for the aforesaid purposes.

In the drawings, Figure 1 is a vertical sectional view of the caster.

Figure 3 is a similar view for pepper.

Like numerals of reference indicate corresponding parts in the various figures.

Figure 1:
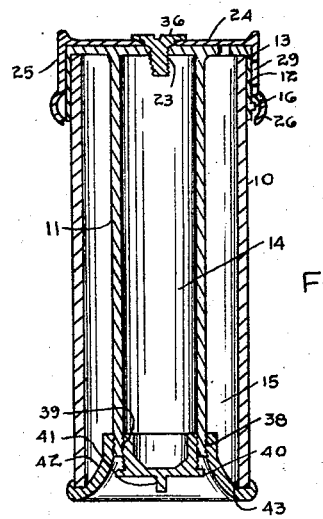
Figure 2:
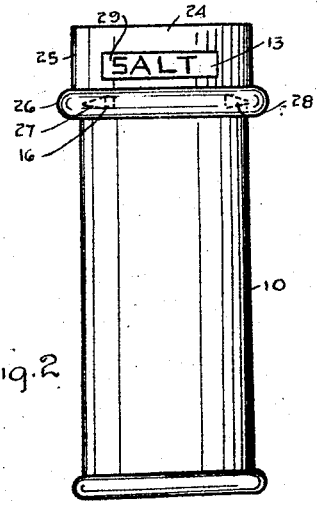
Figure 2 is a side elevational view of the caster, shown for delivering salt.
Figure 4:
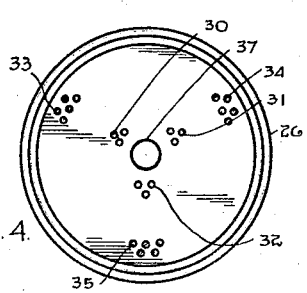
Figure 4 is a plan view of the cap.
Figure 7:
Figure 7 is a perspective detail of the ringed screw stopper for the salt compartment.
Figure 5:
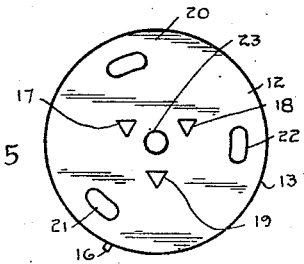
Figure 5 is a plan view of the top of the receptacle.
Figure 8:
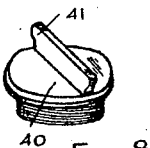
Figure 8 is a perspective detail of the screw stopper for the central pepper compartment.
Figure 6:
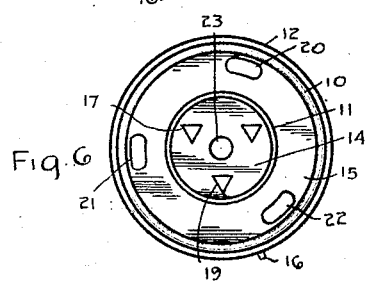
Figure 6 is a plan view of the interior of the receptacle.
Figure 9:
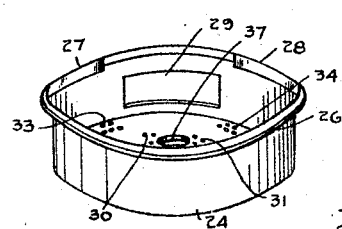
Figure 9 is a perspective detail of the perforated rotary cap showing the interior thereof.

Referring to the drawings, the outer casing 10 and the inner casing 11 are here shown as cylindrical in form and may be of metal, glass or other material. These casing are firmly secured to the top 12, which is flanged over the outer casing 10 and labeled on the flanges 13 with "Pepper" and "Salt" or other words indicating condiments contained in the central chamber 14 and annular chamber 15. The stop 16 projects from the flange 13 towards the lower edge centrally between the label panels. The V-shaped slots 17, 18 and 19 form the outlets from the central chamber 14 and the oval slots 20, 21 and 22 form the outlets from the annular chamber 15, the former slots being in the neighbourhood of the central threaded hole 23 and the latter slots adjacent to the edge of the top.

The rotatable cap 24 is formed with the flange 25 and bead 26 fitting over the top 12, said bead 26 having the stops 27 and 28 distanced from the ends of the view opening 29 through the flange 25, so that by turning the cap 24 on the top 12 the stops 27 and 28 will alternately come into contact with the stop 16 and bring the view opening 29 opposite the label panels disclosing the words "Pepper" and "Salt" in turn.

The cap 24 is pierced with the inner groups of perforations 30, 31 and 32, which register with the inner slots 17, 18 and 19 in the top 12 and the outer groups of perforations 33, 34 and 35, which register with the outer slots 20, 21 and 22. The registration of the inner slots and perforations agree with the disclosure of the label "Pepper" and the registration of the outer slots and perforations with the disclosure of the label "Salt".

The screw 36 forms a pivot for the cap 24 and is screwed into the central threaded hole 23 of the top 12 through the pivot hole 37 in the cap 24.

It will be noticed that the groups of perforations that is to say, the outer and inner groups are radially opposite to the central pivot hole 37, while in the top 12, the inner and outer slots are not in radial alignment with the screw hole 23, as it is essential that the "salt" perforations be closed when the "pepper" perforations are open and vice versa.

The inner casing 11 is shorter than the outer casing 10 and is threaded externally at 38 and internally at 39 and the stopper 40 having the thumb lug 41 is screwed into the internal thread 39 while the ring stopper 42 is screwed on to the external thread 38 and curled around the outer casing 10 finding a seat 43 in said curled end.

In the operation of this caster the chambers are first filled with pepper and salt and the stoppers duly applied and the caster then placed right side up resting on the ring stopper which thus forms the base.

The cap now is turned to bring the top stop to one of the cap stops and the pepper perforations are then registering with the pepper chamber outlets. The top stop is then turned back to the other cap stop, which closes the pepper chamber and opens the salt outlets through the cap perforations.

The shaking is done in the customary way, but is always likely to be more efficiently carried out, as the salt orifices can be kept tightly closed during the time the shaker is not in use and thereby avoid the absorption of moisture.

The condiments pepper and salt have been used largely to explain clearly the operation of the invention, but it will be understood that many different powders, granules and even liquids may be contained in this form of caster, with only reasonable modifications as may be suggested by one familiar with the requirements, and further the shapes of the casings forming the chambers may be varied considerably according to the many designs in which this particular caster may be turned out.

What I claim is:—

A table caster comprising inner and outer casings forming a central chamber and an annular chamber, said inner casing having internal and external threads adjacent to its lower end, a central bottom stopper screwing into the internal thread of said inner casing, an annular stopper screwing into the external thread of said inner casing and engaging the lower end of said outer casing, and a cover at the upper end common to both casings and flanged over the outer casing, said cover being formed of an inner part rigid with the casings and having slots into said central and said annular chambers respectively and an outer part rotatable on the inner part and having holes in groups adapted to register with said slots and view openings in the side wall or flange adapted to disclose labels denoting the contents.

Signed at Montreal, Canada, this 4th day of December 1925.

OSWALD WYNDHAM MANN.